United States Patent [19]

Winchell et al.

[11] 4,171,236

[45] Oct. 16, 1979

[54] METHOD OF MAKING FRANGIBLE SEAL

[75] Inventors: David A. Winchell, Twin Lakes, Wis.; Thomas A. Fowles, McHenry, Ill.

[73] Assignee: Baxter Travenol Laboratories, Inc., Deerfield, Ill.

[21] Appl. No.: 886,081

[22] Filed: Mar. 13, 1978

Related U.S. Application Data

[63] Continuation-in-part of Ser. No. 777,753, Mar. 14, 1977, Pat. No. 4,127,208.

[51] Int. Cl.$^2$ .................... B29C 27/02; B65D 41/32
[52] U.S. Cl. ................................ 156/69; 156/221; 215/232; 215/251; 215/253
[58] Field of Search .............. 156/69, 73.1, 73.5, 156/273, 267, 581, 583, 221, 228, 306; 215/232, 1 C, 251-253, DIG. 3, 32, 250, 249

[56] References Cited

U.S. PATENT DOCUMENTS

| | | | |
|---|---|---|---|
| 3,142,601 | 7/1964 | Polk et al. | 156/273 |
| 3,378,423 | 4/1968 | Polk et al. | 156/273 |
| 3,904,060 | 9/1975 | McPhee | 215/251 |
| 3,923,182 | 12/1975 | Choksi | 215/DIG. 3 |
| 3,929,246 | 12/1975 | Leitz | 215/252 |

Primary Examiner—Michael G. Wityshyn
Attorney, Agent, or Firm—Paul C. Flattery; John P. Kirby, Jr.; George H. Gerstman

[57] ABSTRACT

A method is provided for forming a fracturable seal of the type wherein a plastic cup-shaped closure is hermetically sealed to a plastic planar surface, such as the neck of pharmaceutical solution containers. The seal is formed with the closure by forcing a die heated above the melting point of the plastic material into the planar surface, with the sealing die also being in heat exchange relationship with a portion of the closure. Both the planar surface and the closure adjacent thereto become molten and the surface material is displaced to form a fused seal transverse to the surface. The surface is depressed at least 0.005 inch from its original height by the sealing action of the die, and a frangible section is formed in the vertical side wall of the depression. The seal will be fractured due to tension stress when the closure is removed from the surface.

8 Claims, 5 Drawing Figures

METHOD OF MAKING FRANGIBLE SEAL

BACKGROUND OF THE INVENTION

This application is a continuation-in-part of U.S. application Ser. No. 777,753, filed Mar. 14, 1977, now U.S. Pat. No. 4,127,208.

The present invention concerns an improved method of forming a fracturable seal of the type wherein a first part is hermetically fused to a second part. While the illustrative embodiment is directed to the sealing of closures on containers, it is to be understood that the present invention concerns a method which can be used to seal various types of plastic parts which are to be subsequently separated.

Sterile pharmaceutical solutions, such as 5% dextrose, normal saline and the like, are supplied to hospitals for infusion into a patient's veins from a container hanging above the patient. The sterile liquid flows by gravity through a tubular administration set connected at one end to the container and at an opposite end to a venous needle in the patient.

Such containers are frequently formed of thermoplastic material, and will include a neck portion having one or more ports or openings extending through the neck portion. Such ports may be commonly hermetically sealed to provide sterile sealed contents to the container.

It is desirable that the port be in a sterile environment. Difficulty is experienced with thermoplastic closures bonded directly to the bottle neck in that excessive force is required to fracture or remove the closure. Frangible thermoplastic closures are known, wherein a frangible section is provided around its base defined by a series of slots or cuts in the closure. Such closure does not maintain the sterile environment within the closure. An example of this type of closure is shown in McPhee U.S. Pat. No. 3,904,060.

Thermoplastic closures are also known which are bonded entirely around their base to provide a hermetic seal; a frangible section may be provided adjacent the seal. The frangible sections commonly require flexural shear force to fracture, and the required force frequently is too great for many applications. An example of a closure requiring a separate threaded screw-jack ring to attain flexural shear force to fracture the frangible section is shown in Choksi U.S. Pat. No. 3,923,182.

It is an object of the present invention to provide a method for forming a fracturable seal which is relatively easy to fracture.

Another object of the present invention is to provide a fracturable seal which will be fractured due to tension stress when one part is removed from another part.

A further object of the present invention is to provide a method which enables a simplified closure design, in particular by avoiding the need for an annular brim which extends outwardly from the closure in order to seal the closure to a container.

Other objects and advantages of the present invention will become apparent as the description proceeds.

SUMMARY OF THE INVENTION

In accordance with the present invention, a method is provided for forming a fracturable seal of the type wherein a first part is hermetically fused to a second part. The method comprises the steps of assembling the first part on the second part with the first part substantially seated on the surface of the second part. A sealing die is heated above the melting point of the material of the parts. The sealing die is brought toward the surface on which the first part is seated and alongside and in heat exchange relationship with a portion of the first part. The sealing die is pressed into the surface with both the surface and the first part portion becoming molten. The surface material is displaced to form a fused seal transverse to the surface, whereby the seal will be fractured due to tension stress when the first part is removed from the second part.

In the illustrative embodiment, the sealing die is heated in the range of 1° F. to 100° F. above the melting point of both parts. The surface is depressed at least 0.005 inch from its original height by the sealing action of the die.

In the illustrative embodiment, the first part comprises a plastic cup-shaped closure and the second part comprises the planar surface portion of a container neck. The sealing die has an internal dimension that is substantially equal to the external dimension of the closure's side wall, and the sealing die is brought vertically downwardly and around and in heat exchange relationship with the side wall, so that it is pressed into the planar surface of the container neck.

A more detailed explanation is provided in the following description and claims, and is illustrated in the accompanying drawings.

DETAILED DESCRIPTION OF THE ILLUSTRATIVE EMBODIMENT

Figure 1:
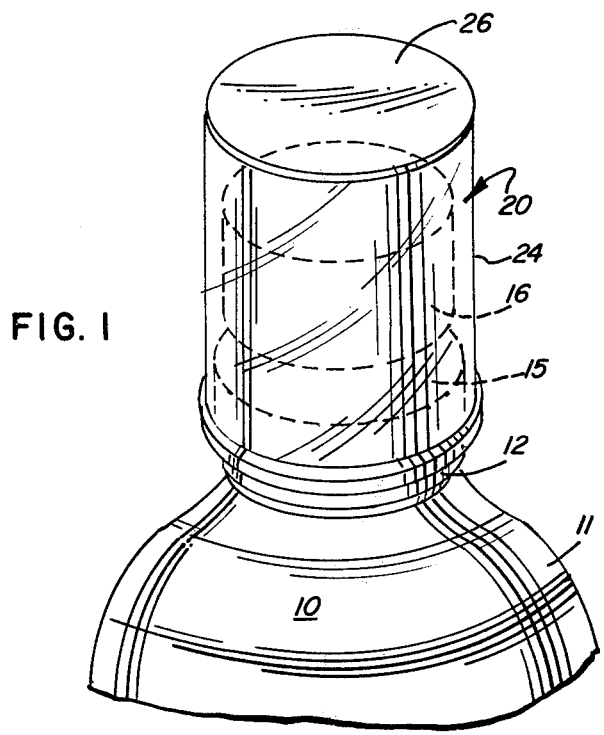
FIG. 1 is a fragmentary perspective view of a container having a protective closure that is sealed to the neck of the container by a method in accordance with the present invention.

Referring now to the drawings, there is fragmentarily illustrated a thermoplastic container 10 having a body 11 and an integral neck portion 12. The neck portion 12 is formed integrally with body 11 of the container 10 in a conventional manner. In the illustrative embodiment, a port 15, here illustrated as a port tube formed integrally with and projecting from the neck portion 12, is provided. The port tube 15 is hermetically sealed as by a threaded closure cap 16.

In accordance with the present invention, a thermoplastic protective closure or protector 20 covers cap 16 to provide a hermetically sealed sterile environment. The closure 20 is generally cup-shaped having a generally circular cross-sectional configuration, with a bottom edge 22 and a side wall 24 extending upwardly therefrom. Preferably side wall 24 is tapered upwardly and inwardly slightly toward the central axis of the closure 20. The side walls extend into an integrally formed top portion 26, with the entire cap 20 formed as a unitary molded piece.

Figure 5:
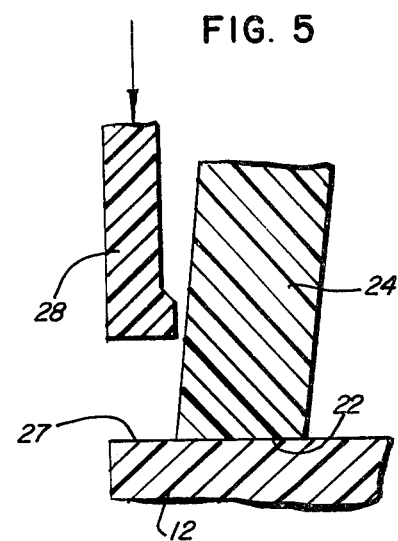
FIG. 5 is an illustration of an assembly step in the manufacture and assembly of the container of FIG. 1.

A method of assembling the closure 20 with the container 10 is illustrated in FIG. 5. As therein illustrated, the closure 20 is assembled over the port or opening with the bottom edge 22 resting on or adjacent the planar top surface 27 of the neck portion 12. A heat and pressure sealing die 28 is heated above the melting temperature of the plastic materials. Sealing die 28 has an internal diameter that is substantially equal to the external diameter of the lower portion of side wall 24, adjacent bottom edge 22.

Figure 3:
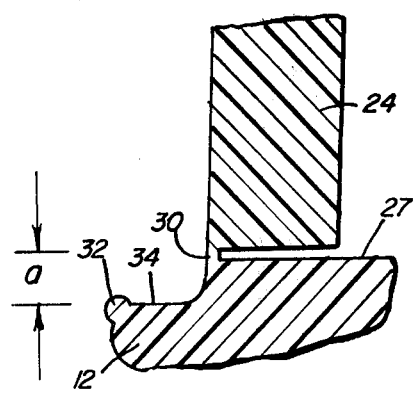
FIG. 3 is an enlarged fragmentary view of the frangible sealed section of the closure and container prior to rupture.
Figure 2:
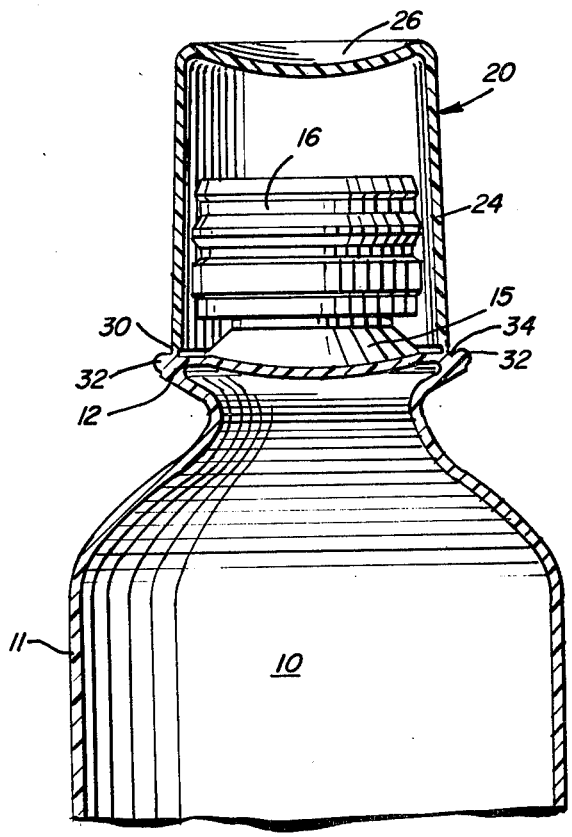
FIG. 2 is an elevational cross-sectional view thereof.

Sealing die 28 is brought downwardly over the closure and in heat exchange relationship with the side wall portion adjacent the bottom edge 22. Continued downward pressure of the sealing die 28 forms a depression 34 in surface 27. Both surface 27 and the side wall 24 become molten, and portions of molten surface 27 are displaced to form a fused seal 30 transverse to surface 27, as shown in FIG. 3. The downward heat and pressure thus moves the container surface material to form thin vertical wall 30 in the area of the internal diameter of the sealing die, and an annular bead 32 is formed about the depression 34.

Figure 4:
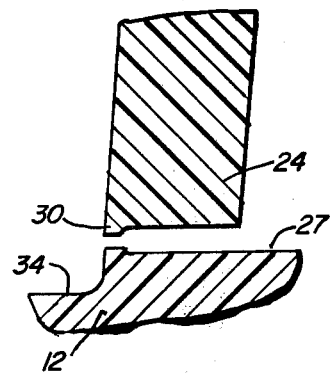
FIG. 4 is an enlarged fragmentary view of the frangible sealed section of FIG. 3 after rupture.

A frangible web or section 30 is thus formed normal to the depression 34 with frangible section 30 forming the vertical side wall of depression 34. Advantageously, the frangible section 30 will rupture under tensile load to provide a horizontal break as shown in FIG. 4. The tensile stress of one suitable polyolefin, for example, polypropylene, is in the range of 4300 and 5500 psi, compared with its flexural yield strength of 6000 to 8000 psi. The seal will therefore rupture under less load than prior commercial seals to make removal of the closure easier. Therefore, although the closure may be used with a screw-jack, it does not require a screw-jack to fracture the frangible section. Additionally, the illustrated horizontal break of the frangible section minimizes hang-ups of a portion of the section, because of the relatively clean and simple rupture of the frangible section as compared with frangible sections requiring a rupture by shear force. The closure is sealed completely around the port with no vent or opening, so that sterility is thus secure.

The closure 20 may be made sufficiently long so that when manually pushed sideways, a sufficient mechanical advantage or leverage is provided so that the frangible section will rupture. It has been found that a length of least as great as the diameter is satisfactory.

Suitable thermoplastic materials for the container and the closure include various polyolefins, for example, polyethylene, polypropylene, polyallomer and copolymers of these. The heating die 28 may be heated in the range of 1° F. to 100° F. above the melting point of the plastics. A temperature of 50° F. above the melting point of the plastic produces satisfactory results.

In a particular embodiment, a depression 0.020 inch deep (dimension a, FIG. 3) was formed and a thin vertical frangible section 30 normal to the planar surface of the neck portion 0.005 inch wide remained. It is preferred that the depression be at least 0.005 inch deep. The frangible section 30 will fracture horizontally in a generally horizontal plane due to tension stress when the closure is removed.

Although an illustrative embodiment of the invention has been shown and described, various modifications and substitutions may be made by those skilled in the art without departing from the novel spirit and scope of the invention.

What is claimed is:

1. A method of forming a fracturable seal of the type wherein a first part is hermetically fused to a second part, the method comprising the steps of:

assembling the first part on the second part with the first part substantially seated on the surface of the second part;

heating a sealing die above the melting point of the material of said parts;

bringing said sealing die towards said surface on which said first part is seated and alongside and in heat exchange relationship with a side portion of the first part; and pressing said sealing die into said surface so that said surface is depressed from its original height by the sealing action of the die, with both said surface and said first part portion becoming molten and displacing said surface material to form a fused seal transverse to said surface, whereby said seal will be fractured due to tension stress when the first part is removed from the second part.

2. A method as described in claim 1, wherein said sealing die is heated in the range of 1° F. to 100° F. above the melting point of both parts.

3. A method as described in claim 1, wherein said surface is depressed at least 0.005 inch from its original height by the sealing action of the die.

4. A method of forming a fracturable seal of the type wherein a plastic cup-shaped closure is sealed to a plastic planar surface, said cup-shaped closure having a bottom edge and a side wall extending upwardly from said bottom edge, said method comprising the steps of:

assembling the closure on the planar surface with said bottom edge substantially seated on said surface;

heating a sealing die, which sealing die has an internal dimension that is substantially equal to the external dimension of the side wall adjacent the bottom surface, to a temperature that is above the melting temperature of the plastic material of the closure and surface;

bringing the sealing die towards said surface and around, and in heat relationship with said side wall; and pressing said sealing die into said surface so that said surface is depressed from its original height by the sealing action of the die, with both said surface and said side wall becoming molten and displacing said surface material to form a fused seal transverse to said surface, whereby said seal will be fractured due to tension stress when the closure is removed from the planar surface.

5. A method as described in claim 4, wherein said sealing die is heated in the range of 1° F. to 100° F. above the melting point of said surface and said side wall.

6. A method as described in claim 4, wherein said surface is depressed at least 0.005 inch from its original height by the sealing action of the die.

7. A method as described in claim 4, said closure having a generally circular cross-sectional configuration with the side wall tapering upwardly and inwardly, said sealing die being brought vertically downwardly toward and into said surface to form said seal.

8. A method of forming a fracturable seal of the type wherein a plastic cup-shaped closure is sealed to a plastic planar surface, said cup-shaped closure having a generally circular cross-sectional configuration, a bottom edge, and a side wall extending upwardly and inwardly from said bottom edge, said method comprising the steps of:

assembling the closure on the planar surface with said bottom edge substantially seated on said surface;

heating a sealing die to a temperature in the range of 1° F. to 100° F. above the melting point of said surface and side wall material, said sealing die having an internal dimension that is substantially equal to the external dimension of the side wall adjacent the bottom surface;

bringing the sealing die vertically downwardly towards said surface and around, and in heat relationship with said side wall; and pressing said sealing die vertically into said surface, so that said surface is depressed at least 0.005 inch from its original height by the sealing action of the die, with both said surface and said side wall becoming molten and thus displacing said surface material to form a fused seal transverse to said surface, whereby said seal will be fractured due to tension stress when the closure is removed from the planar surface.

* * * * *